(12) United States Patent
Rothschild

(10) Patent No.: US 8,610,372 B2
(45) Date of Patent: Dec. 17, 2013

(54) BATTERY-CONSERVING FLASHLIGHT AND METHOD THEREOF

(75) Inventor: Leigh M. Rothschild, Sunny Isles Beach, FL (US)

(73) Assignee: Reagan Inventions, LLC, Sunny Isles Beach, FL (US)

( * ) Notice: Subject to any disclaimer, the term of this patent is extended or adjusted under 35 U.S.C. 154(b) by 83 days.

(21) Appl. No.: 13/337,562

(22) Filed: Dec. 27, 2011

(65) Prior Publication Data

US 2012/0098465 A1   Apr. 26, 2012

(51) Int. Cl.
*G11C 11/24* (2006.01)

(52) U.S. Cl.
USPC .................. 315/291; 315/200 A; 315/360

(58) Field of Classification Search
None
See application file for complete search history.

(56) References Cited

U.S. PATENT DOCUMENTS 6,642,667 B2 * 11/2003 Avis .......................... 315/200 A

* cited by examiner

*Primary Examiner* — Jany Richardson
(74) *Attorney, Agent, or Firm* — Gerald E. Hespos; Michael J. Porco; Matthew T. Hespos

(57) ABSTRACT

A battery-conserving flashlight and method thereof are provided. The flashlight includes a body having a first end and a second end, the first end including an illumination source and the second end including an opening for accessing an interior of the body; at least one battery disposed in the body via the opening in the second end, the at least one battery coupled to and configured for powering the illumination source; and a controller disposed in the body configured to determine if the body is in motion, wherein if the body is not in motion for a predetermined period of time, the controller decouples the at least one battery from the illumination source to conserve energy in the at least one battery. Optionally, the flashlight may include a visual or audible indicator to alert a user that the flashlight will shutdown.

20 Claims, 2 Drawing Sheets

BATTERY-CONSERVING FLASHLIGHT AND METHOD THEREOF

BACKGROUND

1. Field

The present disclosure relates generally to flashlight and battery consuming electronic devices, and more particularly, to a battery-conserving flashlight and method thereof.

2. Description of the Related Art

Flashlights are well known in the art. Generally, flashlights are powered by at least one disposable battery, the size of which depends on the size of the flashlight and wattage of the illumination source, e.g., an incandescent bulb, a light emitting diode (LED), etc.

Energy within the battery is consumed whenever the illumination source is activated, e.g., manually by an on/off switch. Frequently, flashlights are turned on for a specific purpose and left on indefinitely when a user puts the flashlight down to complete a task. In instances, where the user places the flashlight down in an upright position with the illumination source facing downward, the user will most likely not realize the flashlight is still on. Leaving the flashlight on for long periods of time drains the battery, often resulting in a "dead" or unusable flashlight upon the next attempted use.

Upon the next attempted use, at least one new battery will need to be installed (consuming more natural resources) and the depleted battery will need to be disposed of cluttering landfills. Therefore, a need exists for a flashlight which conserves and extends the life of the at least one battery disposed therein.

SUMMARY

A battery-conserving flashlight and method thereof are provided.

In one aspect of the present disclosure, a flashlight is provided including a body having a first end and a second end, the first end including an illumination source and the second end including an opening for accessing an interior of the body; at least one battery disposed in the body via the opening in the second end, the at least one battery coupled to and configured for powering the illumination source; and a controller disposed in the body configured to determine if the body is in motion, wherein if the body is not in motion for a first predetermined period of time, the controller decouples the at least one battery from the illumination source to conserve energy in the at least one battery.

In another aspect, the flashlight further includes a motion sensing device coupled to the controller, the motion sensing device configured to detect motion of the body.

According to a further aspect of the present disclosure, a method for conserving battery life in a flashlight is provided, the method including manually activating the flashlight by a user; detecting if the flashlight is in motion; upon detecting that the flashlight is not in motion, activating a visual indicator; and upon detecting that the flashlight is not in motion for a predetermined period of time, deactivating the flashlight.

In yet another aspect, the method includes activating an audible indicator a second predetermined period of time after activating the visual indicator.

In another aspect, the activating the visual indicator step includes intermittently activating an illumination source of the flashlight.

In still another aspect of the present disclosure, the detecting if the flashlight is in motion step further comprises starting a timer to count to the predetermined period of time. The timer may be restarted by shaking the flashlight.

According to a further aspect of the present disclosure, a battery-conserving electronic device includes a body including an opening for accessing an interior of the body; at least one battery disposed in the body and configured for powering the device; and a controller disposed in the body configured to determine if the body is in motion, wherein if the body is not in motion for a first predetermined period of time, the controller decouples the at least one battery from the electronic device to conserve energy in the at least one battery.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
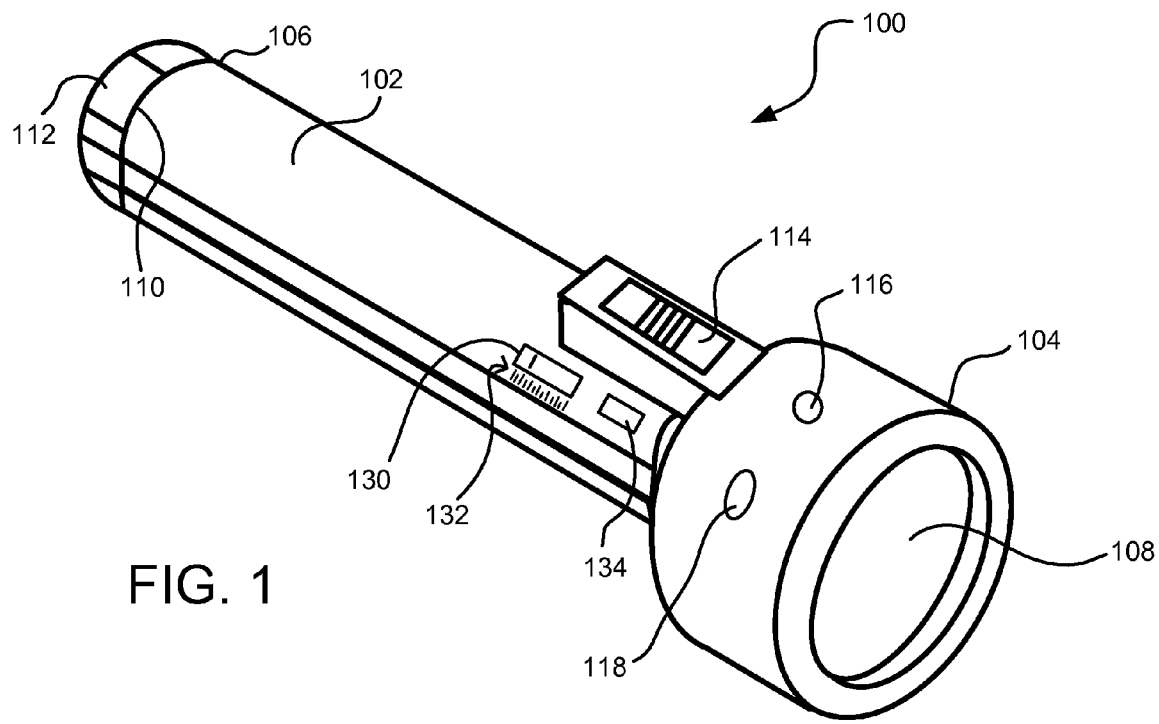
FIG. 1 is a perspective view of a flashlight in accordance with an embodiment of the present disclosure.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The word "exemplary" is used herein to mean "serving as an example, instance, or illustration." Any configuration or design described herein as "exemplary" is not necessarily to be construed as preferred or advantageous over other configurations or designs. Herein, the phrase "coupled with" is defined to mean directly connected to or indirectly connected with through one or more intermediate components. Such intermediate components may include both hardware and software based components.

A battery-conserving flashlight and method thereof are provided. The flashlight of the present disclosure conserves the battery life of at least one battery disposed therein by providing a visual and/or audible warning to a user that the flashlight has been turned on but appears to no longer be in use by an operator or user. The techniques of the present disclosure further provide for shutting off the flashlight or decoupling the battery from an illumination source after a predetermined period of time if the user does not respond to the visual and/or audible alert. In this manner, the flashlight will conserve the energy or battery life of a power or energy source disposed within if the flashlight determines that it is no longer in use.

Referring to FIG. 1, a battery-conserving flashlight 100 in accordance with an embodiment of the present disclosure is illustrated. The flashlight 100 includes a generally cylindrical body 102 having a first end 104 and a second end 106. The first end 104 includes an illumination source 108, e.g., an incandescent light bulb, light emitting diode (LED), etc., and the second end 106 includes an opening 110 for accessing an interior of the body 102. At least one battery, or energy source, is disposed in the body 102 via the second opening 110 and is retained in the body by a cap 112 or similar means. It is to be appreciated that the energy source or battery may be disposable and/or rechargeable.

An on/off switch 114 is provided on an exterior surface of the body 102 for manually activating the flashlight by a user. Furthermore, a visual indicator 116 and audible indicator 118 are also provided on the exterior surface of the flashlight 100, the details of which will be described below.

Figure 2:
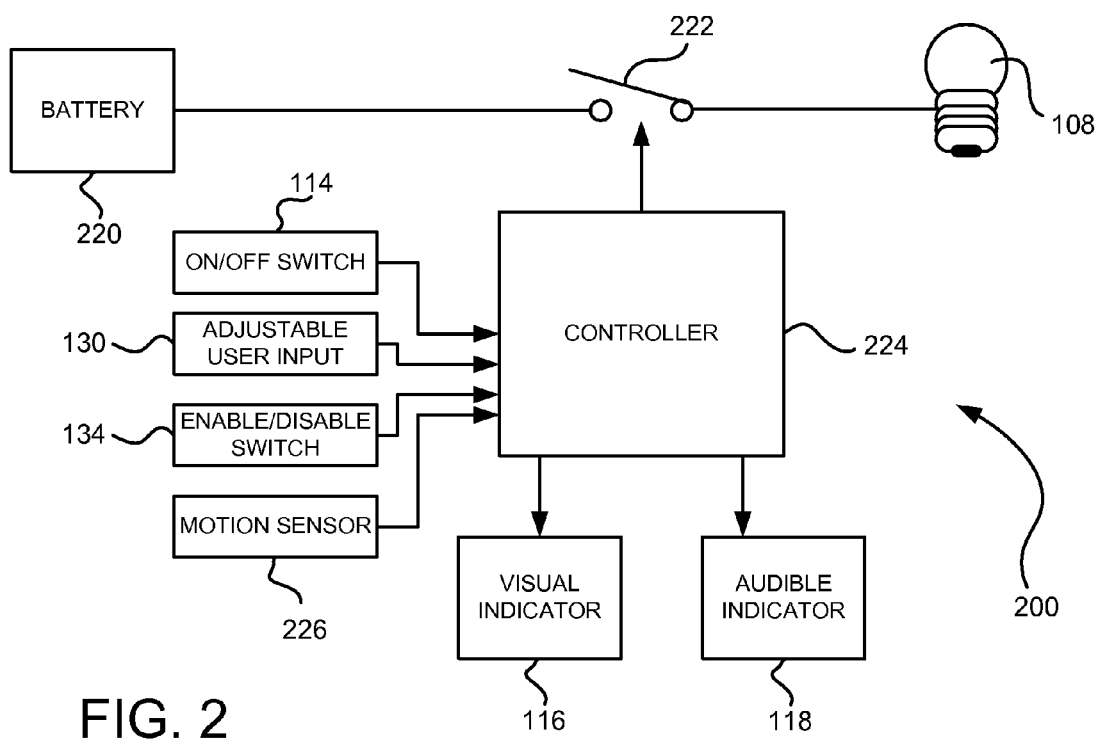
FIG. 2 is a schematic block diagram of a flashlight in accordance with an embodiment of the present disclosure.

Referring to FIG. 2, a schematic diagram 200 of the flashlight 100 is illustrated. At least one battery 220 is coupled to an illumination source 108 and provides power for illuminating the illumination source 108. In one embodiment, the at least one battery 220 is coupled to the illumination source 108 via a switch 222 which is controller by controller 224. The controller 224 controls the switch 222 based on various inputs to the controller 224 for activating or deactivating the illumination source. For example, on/off switch 114 provides an input signal to the controller 224 when the on/off switch 114 disposed on the exterior of the body 102 is manually activated by a user. By controlling the switch 222, the controller 224 couples or decoupled the at least one battery to the illumination source 108.

The controller 224 is configured to determine if the flashlight is in use and, based on whether the flashlight is in use or not, will provide an indication to the user that the flashlight was left on or, alternatively, shut off the flashlight. In one embodiment, the flashlight will include a motion sensing device or sensor 226 configured to determine if the flashlight or body 102 is in motion, e.g., if the flashlight is being carried. An exemplary motion sensor is an accelerometer, which is a sensing element that measures acceleration; acceleration is the rate of change of velocity with respect to time. The accelerometers can be used to measure static acceleration (gravity), tilt of an object, dynamic acceleration, shock to an object, velocity, orientation and the vibration of an object. It is to be appreciated that any known or to be developed accelerometer may be employed including but not limited to capacitive accelerometers, piezoelectric accelerometers, piezoresistive accelerometers, hall effect accelerometers, magnetoresistive accelerometers, heat transfer accelerometers and MEMS (micro-electro mechanical system) based accelerometers. By employing an accelerometer as the motion sensing device 226, the controller 224 can determine if the flashlight is being carried, i.e., is in motion. Additionally, since the accelerometer can determine orientation, the controller 224 can determine if the flashlight was placed on a surface with the illumination source 108 facing downward; in other words, that the first end 104 of flashlight 100 was placed on a surface with the longitudinal axis of the body 102 of flashlight being perpendicular to the surface. In this scenario, the light emitting from the illumination source usually goes undetected and the user will not realize the flashlight is still turned on.

A visual indicator 116 is provided on the exterior surface of the body and is coupled to the controller 224. In one embodiment, the visual indicator 116 is a LED. The controller 224 activates the visual indicator 116 after the controller 224 determines that the body 102 of the flashlight is not in motion or being used. In one embodiment, the controller 224 starts a timer after the controller 224 first determines that the flashlight is not in use and then activates the visual indicator 116 after a predetermined period of time, e.g., 30 minutes. The visual indicator 116 serves as an alert to the user that the flashlight has been left on. It is to be appreciated that this predetermined period of time is adjustable. The predetermined period of time is adjusted by a user input 130 disposed on the exterior surface of the body 102. In one embodiment, the user input 130 is a slider coupled to the controller 224, wherein the user adjusts the slider to the a desired period of time as indicated by a plurality of graduation marks 132 adjacent the slider 130. It is to be appreciated that other types of user inputs may be employed to adjust the predetermined period of time, for example, a dial, pushbutton, etc.

Alternatively, the controller 224 activates an audible indicator 118 after the controller 224 determines the flashlight is not being used. The audible indictor 118 may be a buzzer, beeper, speaker, etc. or any other to be developed audible device.

In one embodiment, the controller 224 activates the visual indicator 116 after a first predetermined period of time of inactivity and then activates the audible indictor 118 after a second period of inactivity just before the controller 224 shuts down the flashlight, e.g., decouples the battery 220 from the illumination source 108.

It is to be appreciated that at any time after the visual and/or audible indicators have been activated the user can prevent the flashlight from turning off by moving the body 102 of the flashlight 100. For example, if the flashlight is use by a user but is not in motion, the user will want the flashlight to remain lit. In this scenario, after either the visual and/or audible indicators have been activated, the user can merely give the body 102 of the flashlight 100 a shake to stop the timer and prevent the flashlight 100 from shutting down. The motion sensor 226 will sense the shake or movement and signal the controller 224 of same.

In another embodiment, the visual indication may be provided by the illumination source 108. In this embodiment, the controller 224 will cause the illumination source to intermittently turn on and off, i.e., to flash, to alert the user that the flashlight has been activated but is possibly not in use. As described above, the controller 224 will intermittently flash the illumination source 108 after a predetermined period of time. The user may stop the flashing of the illumination and return to continuous use by merely shaking the body 102 of the flashlight 100.

In a further embodiment, an enable/disable switch 134 is provided on the exterior of the body 102 to enable or disable the battery conserving features of the flashlight. In the disable mode, the switch 134 sends a signal to the controller 224 to indicate to the controller 224 that monitoring of the motion sensor 226 is to be disable and to leave the illumination source 108 activate regardless of the period of time the illumination source 108 is activate. In the disable mode, the visual and/or audible indicators are never activated.

Figure 3:
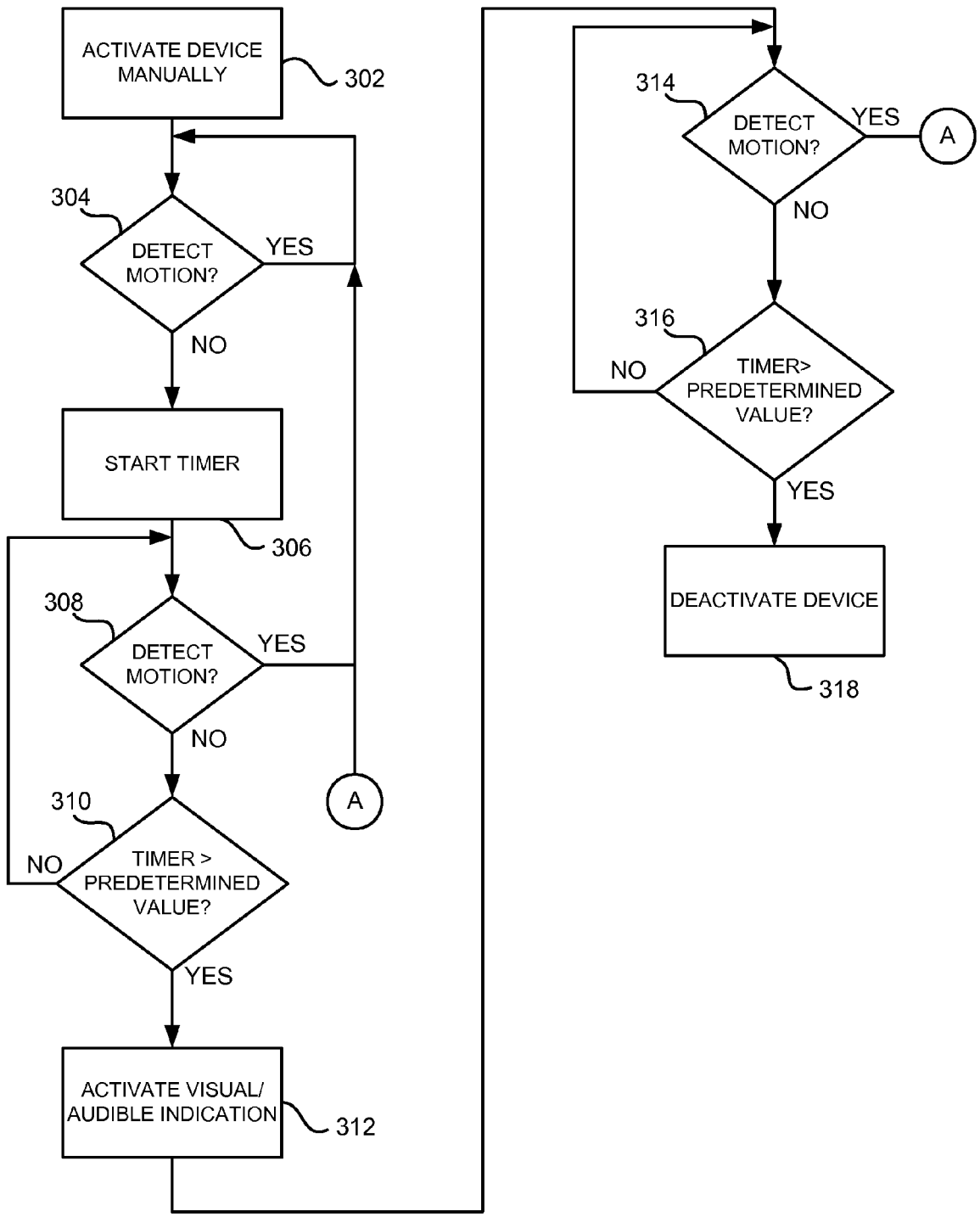
FIG. 3 is a flow chart illustrating a method for conserving battery life in an electronic device in accordance with an embodiment of the present disclosure.

FIG. 3 is a flow chart illustrating a method for conserving battery life in an electronic device in accordance with an embodiment of the present disclosure.

Initially, in step 302, the flashlight 100 is manually activated by the user via on/off switch 114. In step 304, the controller 224 will determine if the flashlight is in use, i.e., the body 102 is in motion. If the flashlight is in use, the controller 224 will continuously monitor for inactivity; otherwise, if the flashlight is not is use, the controller 224 will start a timer, step 306.

In step 308, the controller 224 will check again to see if motion has been detected and, if motion has been detected, the process will revert to step 304. However, if no motion has been detected, the controller 224 will determined if the timer value is greater than a first predetermined period of time, in step 310. If the timer value is less than the first predetermined period of time, the process will revert to step 308. If the timer value is greater than the first predetermined period of time, the controller 224 will activate the visual and/or audible indicators 116, 118, in step 312.

After the visual and/or audible indicators have been activated, the controller 224 will continue to monitor for use or motion, in step 314. At this point if motion has been detected, e.g., in response to the user shaking the flashlight, the process will revert to step 304 and the visual and/or audible indicators will be deactivated. If motion has still not been detected, the controller 224 will determined if the timer value is greater than a second predetermined period of time, step 316. It is to be appreciated that all predetermined periods of time referenced in the present disclosure are adjustable by the user, for example, by the input mechanism 130 disposed on the exterior surface of the body 102 of the flashlight 100. If the timer value is less than the second predetermined period of time, the process will revert to step 314. If the timer value is greater than the first predetermined period of time, the controller 224 will deactivate the flashlight, in step 318, i.e., will decouple the battery 220 from the illumination source 108.

By employing the devices and techniques described above, the flashlight of the present disclosure will conserve the energy level or battery life of the power source disposed within. In the case of a disposable battery or power source, less batteries will be used resulting in less physical waste to be disposed of and, in the case of a rechargeable battery or power source, less electricity will be consumed to recharge the batteries. It is to be appreciated that although the context of the present disclosure was described in relation to a flashlight the teachings, techniques and principles of the present disclosure can be applied to other electronic device that employ at least one battery, for example, a radio, portable media player, mobile phone, laptop computer, tablet, etc. It is to be appreciated that this list is merely illustrative and in no way meant to be exhaustive.

Although the disclosure herein has been described with reference to particular illustrative embodiments, it is to be understood that these embodiments are merely illustrative of the principles and applications of the present disclosure. Therefore numerous modifications may be made to the illustrative embodiments and other arrangements may be devised without departing from the spirit and scope of the present disclosure, which is defined by the appended claims.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term _____ is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

What is claimed is:

1. A flashlight comprising:
   a body having a first end and a second end, the first end including an illumination source and the second end including an opening for accessing an interior of the body;
   at least one battery disposed in the body via the opening in the second end, the at least one battery coupled to and configured for powering the illumination source;
   a controller disposed in the body configured to determine if the body is in motion, wherein if the body is not in motion for a first predetermined period of time, the controller decouples the at least one battery from the illumination source to conserve energy in the at least one battery; and a visual indictor disposed on an exterior surface of the body, wherein the controller activates the visual indicator after a second predetermined period of time of no motion, the second predetermined period of time being less than the first predetermined period of time.

2. The flashlight of claim 1, further comprising at least one first switch for coupling the at least one battery to the illumination source, the at least one first switch being controlled by the controller.

3. The flashlight of claim 1, further comprising a motion sensing device coupled to the controller, the motion sensing device configured to detect motion of the body.

4. The flashlight of claim 3, wherein the motion sensing device is an accelerometer.

5. The flashlight of claim 1, further comprising an audible indictor disposed on an exterior surface of the body, wherein the controller activates the audible indicator after the second predetermined period of time of no motion, the second predetermined period of time being less than the first predetermined period of time.

6. The flashlight of claim 2, wherein the controller is configured to intermittently activate the at least one first switch after the second predetermined period of time of no motion to flash the illumination source, the second predetermined period of time being less than the first predetermined period of time.

7. The flashlight of claim 3, further comprising a second switch for enabling or disabling the motion sensing device, the second switch being disposed on an exterior surface of the body for manual activation by a user.

8. A method for conserving battery life in a flashlight, the method comprising:
   manually activating the flashlight by a user;
   detecting if the flashlight is in motion;
   upon detecting that the flashlight is not in motion, activating a visual indicator; and
   upon detecting that the flashlight is not in motion for a predetermined period of time, deactivating the flashlight.

9. The method of claim 8, further comprising activating an audible indicator a second predetermined period of time after activating the visual indicator.

10. The method of claim 8, wherein the activating the visual indicator step includes intermittently activating an illumination source of the flashlight.

11. The method of claim 8, wherein the detecting if the flashlight is in motion step further comprises starting a timer to count to the predetermined period of time.

12. The method of claim 11, further comprising restarting the timer by shaking the flashlight.

13. The method of claim 12, wherein the predetermined period of time is adjustable.

14. A battery-conserving electronic device comprising:
   a body including an opening for accessing an interior of the body;
   at least one battery disposed in the body and configured for powering the device;
   a controller disposed in the body configured to determine if the body is in motion, wherein if the body is not in motion for a first predetermined period of time, the controller decouples the at least one battery from the electronic device to conserve energy in the at least one battery; and
   a visual indictor disposed on an exterior surface of the body, wherein the controller activates the visual indicator after a second predetermined period of time of no motion, the second predetermined period of time being less than the first predetermined period of time.

15. The electronic device of claim 14, further comprising at least one first switch for coupling the at least one battery to the electronic device, the at least one first switch being controlled by the controller.

16. The electronic device of claim 14, further comprising a motion sensing device coupled to the controller, the motion sensing device configured to detect motion of the body.

17. The electronic device of claim 16, further comprising a second switch for enabling or disabling the motion sensing device, the second switch being disposed on an exterior surface of the body for manual activation by a user.

18. The electronic device of claim 14, further comprising an audible indictor disposed on an exterior surface of the body, wherein the controller activates the audible indicator after the second predetermined period of time of no motion, the second predetermined period of time being less than the first predetermined period of time.

19. A flashlight comprising:
   a body having a first end and a second end, the first end including an illumination source and the second end including an opening for accessing an interior of the body;
   at least one battery disposed in the body via the opening in the second end, the at least one battery coupled to and configured for powering the illumination source;
   a controller disposed in the body configured to determine if the body is in motion, wherein if the body is not in motion for a first predetermined period of time, the controller decouples the at least one battery from the illumination source to conserve energy in the at least one battery; and
   an audible indictor disposed on an exterior surface of the body, wherein the controller activates the audible indicator after a second predetermined period of time of no motion, the second predetermined period of time being less than the first predetermined period of time.

20. A battery-conserving electronic device comprising:
   a body including an opening for accessing an interior of the body;
   at least one battery disposed in the body and configured for powering the device;
   a controller disposed in the body configured to determine if the body is in motion, wherein if the body is not in motion for a first predetermined period of time, the controller decouples the at least one battery from the electronic device to conserve energy in the at least one battery; and
   an audible indictor disposed on an exterior surface of the body, wherein the controller activates the audible indicator after a second predetermined period of time of no motion, the second predetermined period of time being less than the first predetermined period of time.

* * * * *